Patented Jan. 6, 1953

2,624,764

UNITED STATES PATENT OFFICE 2,624,764

PREPARATION OF KETO ALDEHYDES

William S. Emerson and Raymond I. Longley, Jr., Dayton, Ohio, assignors to Monsanto Chemical Company, St. Louis, Mo., a corporation of Delaware No Drawing. Application December 27, 1949, Serial No. 135,304

3 Claims. (Cl. 260—590)

This invention relates to a new method of preparing polyfunctional compounds. More specifically the invention relates to the preparation of aldehyde-ketones by a new and economical method.

The purpose of the present invention is to provide a new method of preparing certain aldehyde-ketones. A further purpose of this invention is to provide a means of converting alkoxydihydropyrans into useful compounds having both aldehyde and ketone groups. A still further purpose of this invention is to provide a new and convenient method of preparing valuable compounds.

In copending application Serial No. 106,483, filed July 23, 1949, by Raymond I. Longley, Jr., now abandoned, there are described and claimed new chemical compounds, the alkoxydihydropyrans and methods for their preparation by the condensation of alkyl vinyl ethers with $\alpha,\beta$-unsaturated aldehydes or ketones.

It has now been found that certain of the alkoxydihydropyrans may be conveniently and economically hydrolyzed to form valuable derivatives. This method of synthesis involves the preparation of compounds having one aldehyde group and one ketone radical.

The general reaction involved in the preparation of the new compounds may be represented by the following equation:

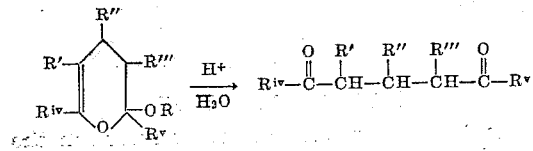

wherein R is any alkyl radical having from one to four carbon atoms, the various R' to R$^v$ groups may be hydrogen or aromatic, alicyclic i. e., compounds having a saturated ring, heterocyclic or alkyl radicals having up to eight carbon atoms, and only one of the R$^{iv}$ and R$^v$ groups is hydrogen. The alkoxydihydropyrans useful in the practice of this invention are prepared by the condensation of acrolein, substituted acroleins, vinyl ketones and substituted vinyl ketones of the type:

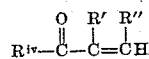

and vinyl ethers of the type:

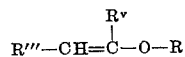

wherein the various R radicals are as described above.

In conducting the generic reaction described in the preceding paragraph compounds having two ketone radicals may be prepared if the R$^{iv}$ and R$^v$ groups are both substituents other than hydrogen.

The aldehyde-ketones are prepared by hydrolyzing the described alkoxydihydropyrans in the presence of an acid, for example dilute hydrochloric acid, or a water suspension of an acidic ion exchange resin. The reaction will take place usually at normal room temperature, however, slight heating may be preferred to accelerate the hydrolysis. The period of time required to effect a satisfactory completion of the reaction will depend upon the solubility of the water in the alkoxydihydropyrans. The addition of a mutual solvent may be necessary in many cases; acetone, methanol and dioxane are useful mutual solvents. The desired aldehyde-ketones may be recovered from the reaction mass by extraction, followed by distillation, under reduced pressure if necessary. In some cases the aldehyde-ketones may be used without isolation and converted to derivatives by oxidation, reduction or other conventional chemical reactions.

Further details of the invention are set forth with respect to the following examples.

*Example 1*

A mixture of 50 grams of 2-ethoxy-2-methyl-3,4-dihydro-1,2-pyran, 100 mls. of water and 10 mls. of concentrated hydrochloric acid was stirred for thirty minutes at a temperature range from 20° to 40° C. The reaction mixture was neutralized with sodium bicarbonate and saturated with sodium chloride. The reaction mixture was then extracted three times with 100 mls. of ether and the extract diluted with 150 mls. of hexane and 100 mls. of benzene. The ether was removed by distillation and the residue refluxed using a Dean and Stark trap on the condenser to remove water and ethanol. The residue was then distilled using a Lecky-Ewell column to give 31 grams of product, boiling at 87 to 89° C. at 15 mm. pressure. The product was identified as 5-oxohexanal.

*Example 2*

A mixture of 102 grams of 2-methoxy-6-methyl-4-phenyl-3,4-dihydro-1,2-pyran, 100 mls. of acetone, 60 mls. of water and 3 mls. of concentrated hydrochloric acid was stirred in a nitrogen atmosphere for two hours at a maximum temperature of 40° C. The reaction mixture was neutralized with sodium bicarbonate and saturated with sodium chloride. The product was mixed with 250 mls. of hexane and 100 mls. of benzene and then two liquid phases separated. On distillation of the organic phase a fraction was recovered boiling at 133 to 137° C. and two mm. pressure. The compound was identified as 5-oxo-3-phenylhexanal.

The following tabulation demonstrates the manner in which the various dihydropyran intermediates may be prepared by the selection of alkyl vinyl ethers or substituted vinyl ethers and the α,β-unsaturated aldehydes or ketones. The mechanism for the preparation of aldehyde-ketones and the manner by which the various substituted aldehyde ketones may be prepared will also be apparent.

| | | |
|---|---|---|
| (A) | Raw materials | Methyl vinyl ether. Methyl vinyl ketone. |
| | Intermediate | 2-methoxy-6-methyl-3,4-dihydro-1,2-pyran. |
| | Aldehyde ketone | $CH_3-\overset{O}{\overset{\|}{C}}-CH_2-CH_2-CH_2-\overset{O}{\overset{\|}{C}}-H$ |
| (B) | Raw materials | Isopropenyl methyl ether. Acrolein. |
| | Intermediate | 2-methoxy-2-methyl-3,4-dihydro-1,2-pyran. |
| | Aldehyde ketone | $H-\overset{O}{\overset{\|}{C}}-CH_2-CH_2-CH_2-\overset{O}{\overset{\|}{C}}-CH_3$ |

This aldehyde ketone is identical to that prepared by method A.

| | | |
|---|---|---|
| (C) | Raw materials | Isopropenyl methyl ether. Methacrolein. |
| | Intermediate | 2-methoxy-2,5-dimethyl-3,4-dihydro-1,2-pyran. |
| | Aldehyde ketone | $H-\overset{O}{\overset{\|}{C}}-\overset{CH_3}{\overset{\|}{CH}}-CH_2-CH_2-\overset{O}{\overset{\|}{C}}-CH_3$ |
| (D) | Raw materials | Ethyl isopropenyl ether. Crotonaldehyde. |
| | Intermediate | 2-ethoxy-2,4-dimethyl-3,4-dihydro-1,2-pyran. |
| | Aldehyde ketone | $H-\overset{O}{\overset{\|}{C}}-CH_2-\overset{CH_3}{\overset{\|}{CH}}-CH_2-\overset{O}{\overset{\|}{C}}-CH_3$ |
| (E) | Raw materials | Isobutyl vinyl ether. Methyl isopropenyl ketone. |
| | Intermediate | 2-isobutoxy-5,6-dimethyl-3,4-dihydro-1,2-pyran. |
| | Aldehyde-ketone | $CH_3-\overset{O}{\overset{\|}{C}}-\overset{CH_3}{\overset{\|}{CH}}-CH_2-CH_2-\overset{O}{\overset{\|}{C}}-H$ |
| (F) | Raw materials | Isopropyl vinyl ether. Benzalacetone. |
| | Intermediate | 2-isopropoxy-4-phenyl-6-methyl-3,4-dihydro-1,2-pyran. |
| | Aldehyde-ketone | $CH_3-\overset{O}{\overset{\|}{C}}-CH_2-\overset{C_6H_5}{\overset{\|}{CH}}-CH_2-\overset{O}{\overset{\|}{C}}-H$ |
| (G) | Raw materials | Furfuralacetophenone. Methyl vinyl ether. |
| | Intermediate | 2-methoxy-4-(2-furyl)-6-phenyl-3,4-dihydro-1,2-pyran. |
| | Aldehyde-ketone | 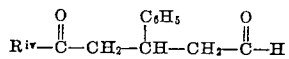 |
| (H) | Raw materials | Cyclohexyl vinyl ketone. Ethyl vinyl ether. |
| | Intermediate | 2-ethoxy-6-cyclohexyl-3,4-dihydro-1,2-pyran. |
| | Aldehyde-ketone | 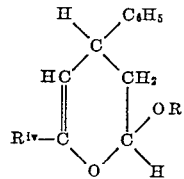 |

The invention is defined by the following claims.

We claim:

1. The method of preparing ketone-aldehydes having the structure:

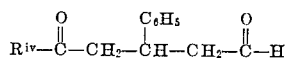

which comprises subjecting to hydrolysis in an aqueous acid medium a 2-alkoxy-4-phenyl-3,4-dihydro-1,2-pyran having the structure:

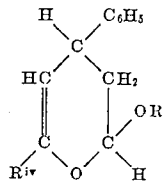

wherein R is an alkyl radical having up to 4 carbon atoms, and $R^{iv}$ is a monovalent saturated hydrocarbon radical free from non-benzenoid unsaturation, the radicals other than aryl being saturated having up to 8 carbon atoms, and separating the resulting ketone-aldehyde.

2. The method of preparing ketone-aldehydes having the structure:

$$R^{iv}-\overset{O}{\overset{\|}{C}}-CH_2-\overset{C_6H_5}{\overset{\|}{CH}}-CH_2-\overset{O}{\overset{\|}{C}}-H$$

which comprises subjecting to hydrolysis in an aqueous acid medium a 2-alkoxy-6-alkyl-4-phenyl-3,4-dihydro-1,2-pyran having the structure:

wherein R is an alkyl radical having up to 4 carbon atoms, and $R^{iv}$ is an alkyl radical having up to 8 carbon atoms, and separating the resulting ketone-aldehyde.

3. The method of preparing 5-oxo-3-phenylhexanal, which comprises subjecting to hydrolysis in an aqueous acid medium a 2-alkoxy-4-phenyl-6-methyl-3,4-dihydro-1,2-pyran, wherein the alkoxy group has up to four carbon atoms, and separating the resulting ketone-aldehydes.

WILLIAM S. EMERSON.
RAYMOND I. LONGLEY, Jr.

REFERENCES CITED

The following references are of record in the file of this patent:

UNITED STATES PATENTS

| Number | Name | Date |
|---|---|---|
| 2,052,652 | Perkins et al. | Sept. 1, 1936 |
| 2,515,304 | Jones | July 18, 1950 |
| 2,546,018 | Smith et al. | Mar. 20, 1951 |

OTHER REFERENCES

Woods et al., J. Am. Chem. Soc., vol. 68, pp. 2483–85 (1946).

Woods, Organic Synthesis, vol. 27, pp. 43–44 (1947).